(12) United States Patent
Ito

(10) Patent No.: US 6,475,670 B1
(45) Date of Patent: Nov. 5, 2002

(54) BINDERS FOR POROUS ELECTRODES AND POROUS ELECTRODES USING THE SAME BINDERS

(76) Inventor: Junji Ito, 20 Higashiyashiki, Haguroshinden, Inuyama-shi, Aichi-ken (JP)

( * ) Notice: Subject to any disclaimer, the term of this patent is extended or adjusted under 35 U.S.C. 154(b) by 120 days.

(21) Appl. No.: 09/665,953

(22) Filed: Sep. 21, 2000

(30) Foreign Application Priority Data

Sep. 22, 1999 (JP) .......................................... 11-268337

(51) Int. Cl.[7] .............................. H01M 4/62; H01G 9/58
(52) U.S. Cl. ...................... 429/217; 429/232; 361/502; 361/509; 361/523; 361/529
(58) Field of Search .................................. 429/217, 232; 361/502, 509, 523, 529

(56) References Cited

U.S. PATENT DOCUMENTS 6,001,139 A * 12/1999 Asanuma et al. .......... 29/623.3

FOREIGN PATENT DOCUMENTS

| JP | 10-106577 | * 4/1998 |
| JP | 11-135379 | * 5/1999 |

* cited by examiner

*Primary Examiner*—Laura Weiner
(74) *Attorney, Agent, or Firm*—Wenderoth, Lind & Ponack, L.L.P.

(57) ABSTRACT

It is intended to provide an electrode material, which is excellent in electrostatic capacitance and low resistance, by improving conductive fine particle deposition factor and also improving the close contact between the conductive fine particles and the conductive base.

A binder for a porous electrode, which is obtained by dispersing conductive fine particles such as active carbon and graphite and non-conductive fine particles 3 such as aluminum and zinc oxide in a rubber type binder 1 having been made porous by cross-linking, is developed on a conductive base 5 to form a porous electrode.

10 Claims, 3 Drawing Sheets

BINDERS FOR POROUS ELECTRODES AND POROUS ELECTRODES USING THE SAME BINDERS

BACKGROUND OF THE INVENTION

1. Field of the Invention

This invention relates to binders for porous electrodes used as carbon electrode of electric double layer capacitors, electrolytic capacitors and lithium ion secondary batteries and novel porous electrodes using the same binders.

2. Prior Art

Carbon electrodes using active carbon find extensive applications as anode and cathode electrodes of electric double layer capacitors, cathode electrodes of lithium ion secondary batteries, etc. The carbon electrode is manufactured by coating or depositing a composition, which is obtained by using a dispersion of polytetrafluoroethylene (PTFE) as binder and incorporating active carbon, carbon black or conductive polymer, on a base such as an aluminum foil and drying the coating.

The electrostatic capacitance of carbon electrodes or the like for electric double layer capacitors and lithium ion secondary batteries depend on the contact area (i.e., effective contact area) between conductive fine particles and electrolyte power unit projection area of electrode foil. Specifically, the electrostatic capacitance is closely related to such parameters as the specific area of conductive fine particles themselves and the deposition density of conductive fine particles per unit projection area of electrode foil.

However, an upper limit is imposed on the specific area of conductive fine particles, and revolutional increase of the electrostatic capacitance by movement of the specific area can be hardly expected. It is thus thought to be important how efficiently conductive fine particles are to be deposited on the electrode foil. PTFE which is used as binder in the carbon electrode has lower adhesion, and it is thus inferior in such connection as the conductive fine particle deposition property and the close contact between the conductive fine particles and the electrode foil. Also, since the binder has lower adhesion, the conductive fine particles are readily separated from the electrode foil, and the binder is thus inferior in connection with the resistance against vibrations. The above drawbacks may be improved by adding a great quantity of binder. However, by increasing the quantity of binder added the resistance of the electrode is correspondingly increased. At any rate, it is impossible to obtain a sufficiently practical electrode.

The inventor accordingly proposed in Japanese Patent Laid-Open No. 11-135379 that a porous electrode material having excellent electrostatic capacitance is obtainable by dispersing conductive film particles in porous rubber.

Thus electrode material has excellent electrostatic capacitance. However, pressing the electrode for improving the electrostatic capacitance per unit volume, gives rise to a problem that the conductive fine particles and the porous rubber in the electrode material are mashed to result in reduction of the electrostatic capacity. In addition, there is some demand for improving the material in the aspect of the close contact between the porous electrode and a conductive base (i.e., collector electrode).

SUMMARY OF THE INVENTION

The invention has an object of providing an electric material having excellent electrostatic capacitance and low resistance by improving the conductive fine particle deposition factor and also improving the close contact between conductive fine particles and conductive base.

Another object of the invention is to provide an electrode material, which is excellent in adhesion, solvent resistance, vibration resistance and other properties.

DETAILED DESCRIPTION OF THE PREFERRED EMBODIMENTS

The binder for porous electrode according to the invention features that a conductive adhesion solution ion which conductive fine particles and non-conductive fine particles are dispersed in rubber solution is used as electrode material. The porous electrode according to the invention also features that the binder for the porous electrode is dried and then subjected to a heat treatment for cross-linking to obtain a porous structure as porous electrode. According to the invention, it is further featured the porous electrode obtained in this way is developed to a conductive base (i.e., collector electrode).

Figure 1:
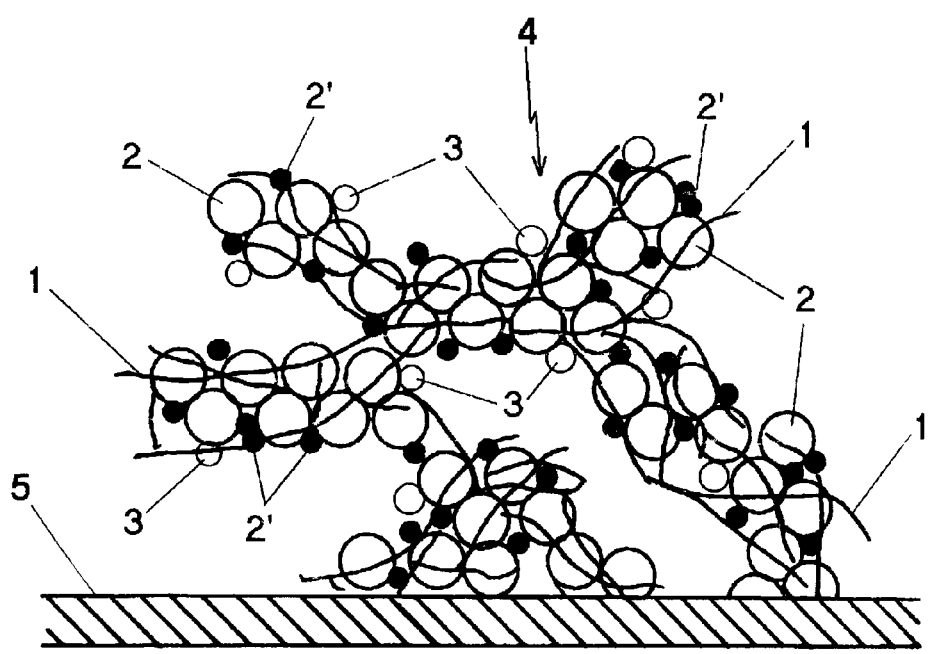
FIG. 1 is a view schematically showing the structure of a porous electrode according to the invention.
Figure 2:
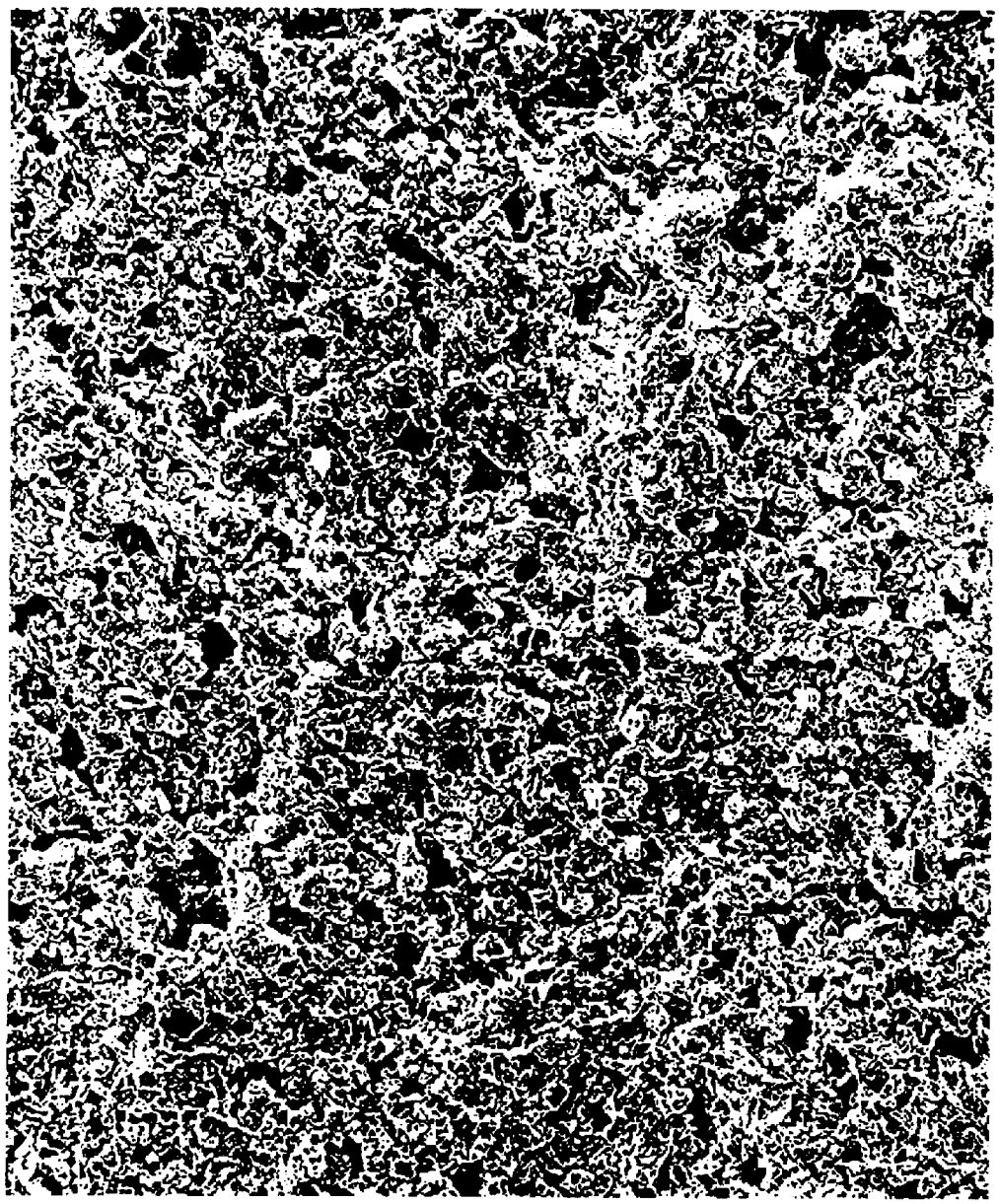
FIG. 2 is a view showing a scanning electron microscope (200 times) of the surface of the porous electrode according to the invention.
Figure 3:
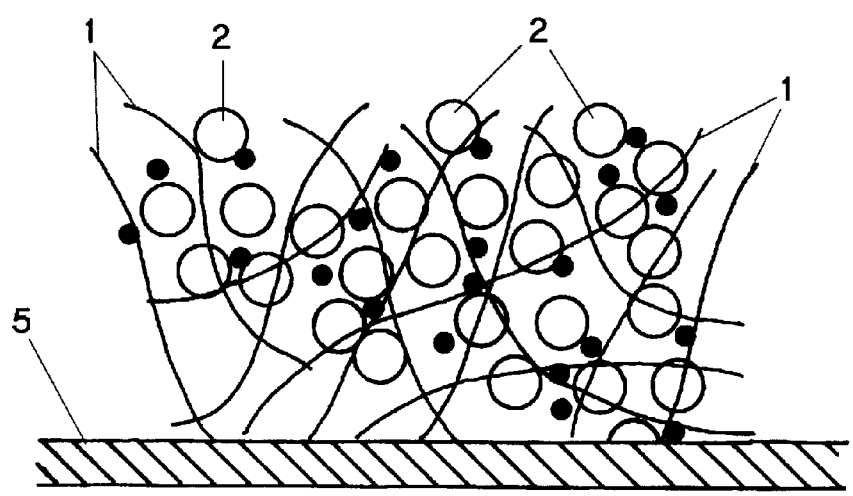
FIG. 3 is a view schematically showing the prior art electrode structure.

As will be described hereunder as Example 1, as shown in FIG. 1, a porous electrode 4 is formed by dispersing non-conductive fine particles 3 composed of conductive fine particles 2 constituted by active carbon, graphite 2' and alumina in rubber type binder 1 as adhesive material, and this porous electrode 4 is developed on the conductive material 5 (collector electrode). As schematically shown in FIG. 1, the porous electrode has an electrode structure having numerous pores. FIG. 2 shows the result of observation of the electrode surface according to the invention (with a promoted porous structure obtained by contracting rubber molecules by cross-linking). As shown, the pores are constituted by continuous pores (shown as black parts) arranged in a three-dimensional net-like fashion. The degree of power structure promotion (i.e., porosity) may be suitably adjusted in dependence on the purpose of the final product and the type or kind of rubber (i.e., binder) used.

The kind of the rubber type binder is not limited so long as the above porous structure promotion can be realized, and any well-known rubber may be adopted as desired. For example, it is possible to use such types of synthetic rubber as butyl rubber, ethylenepropylenediene rubber, isopropylene rubber, nitrile rubber and butadiene rubber. The types of rubber may be used alone or combinations of two or more of them.

However, swelling of rubber may take place depending on the combination of the rubber with the electrolyte solution that is used. In such a case, swelling spoils the porosity of the rubber. According to the invention, it is necessary to appropriately select rubber, which is not substantially caused to swell by the electrolyte solution. Specifically, it is suitable to use rubber having resistance against electrolyte rubber. Particularly, when using propylene carbonate as at least part of the solvent of the electrolyte solution. It is suitable to select butyl rubber, ethylenepropylenediene rubber, etc. These types of rubber are free from swelling by propylene carbonate, and even these porous rubber types permit maintaining excellent and stable porosity, ensuring satisfactory state of contact between the electrolyte solution and the conductive fine particles and obtaining electrode materials which provide more excellent electrostatic capacity.

As the conductive fine particles may be used those which are like conductive fine particles used in well-known carbon electrodes or the like. For example, it is possible to use at least one type of conductive fine particles, such as carbon type, conductive polymer type and metal type. Examples of these types of conductive fine particles are carbon type, e.g., active carbon (activated by water vapor, activated by chemical, activated by alkali, etc.), carbon black (acetylene black, ketjen black), graphite, meso-phase carbon, carbon nanotube, etc., conductive polymer type, e.g., polyacetylene, polyparaphenylene, polyphenylenevinylene, polypyrrole, polyanylene, etc., and metal type, e.g., aluminum, tantalum, titanium, nickel, vanadium oxide, ruthenium oxide, titanium nitride lithium manganate, lithium cobaltate, etc., in the form of particles, flakes or fibers. These types of conductive fine particles may be used as single one of them or as a combination of two or more of them.

The average particle diameter of the conductive fine particles may be appropriately in dependence on the type of particles or the like. For example, the average particle diameter is usually about 0.5 to 20 $\mu$m, preferably 1 to 15 $\mu$m, when the conductive fine particles are of carbon type, usually about 0.05 to 10 $\mu$m, preferably 0.1 to 3 $\mu$m, when the particles are of conductive polymer type, and 0.01 to 10 $\mu$m, preferably 0.05 to 1 $\mu$m, when the particles are of metal type.

As the non-conductive fine particles may be used well-known inorganic fine particles, organic fine particles in the form of flakes and fibers. Specifically, as specific example, it is possible to use one or more members of the group consisting of such inorganic fine particles as those of silica, zinc oxide, magnesium oxide, magnesium carbonate, wollastonite, diatomaceous earth, mica, calcium carbonate, aluminum hydroxide, alumina, magnesium hydroxide, clay and chalk and such inorganic fine particles as wood particles and pulp. These members may be used as a sole one of them or a combination of one or more of them.

The average particle diameter of the non-conductive fine particles may be appropriately set in dependence on the types of these particles. Usually, the average particle diameter may be about 0.01 to 50 $\mu$m, preferably 0.05 to 20 $\mu$m.

In addition to the above main components (i.e., rubber, conductive fine particles and non-conductive fine particles) other components may be contained in ranges free from spoiling the effects of the invention. For example, such additives as rubber cross-linking materials, rubber cross-linking promoting materials, adhesion increasing materials and rubber deterioration preventing materials may be contained.

As the conductive base which serves as collector electrode, may be selected a member of the group consisting of aluminum, nickel, copper, stainless steel, titanium and conductive rubber sheet in the form of foil, net, punched metal and expanded metal. The surface of the conductive base is preferably coarsened by acid process, alkali process or blast process for enhancing the close contact between the base and the porous electrode film or for increasing the surface area and thus enhancing the current collection effect.

For improving the output by enhancing the close contact of the conductive base surface, it is preferable to form a thin colloidal carbon layer by using water glass as binder and also forming a thin layer of silane coupling, titanium coupling, etc.

The porous electrode according to the invention is obtainable by preparing a mixture containing a rubber solution, which is obtained by dissolving rubber in a solvent, conductive fine particles and non-conductive fine particles, then forming a film of the mixture on a conductive base and drying the film.

The solvent is not particularly limited so long as it can dissolve rubber that is used, and any well-known solvent may be appropriately selected in dependence on the type of rubber to be made porous. For example, toluene may be used in the case of butyl rubber, ethylenepropylenediene rubber, etc., and cyclohexene may be used in the case of nitrile rubber.

The rubber concentration (solid part) in the rubber solution is not particularly limited so long as a predetermined quantity of rubber as will be described hereinafter is set for the mixture, and may be appropriately set in dependence on the types of rubber and solvent used. Usually, the concentration may be about 5 to 30% by weight. Then, the rubber solution, the conductive fine particles and the non-conductive fine particles are mixed together. The conductive fine particles used may be these like what are shown above.

The proportion of the rubber type binder (solid part) is appropriately set in dependence on the purpose of the final product and the type of the rubber type binder. Usually, the proportion may be about 2 to 50 parts by weight, preferably 5 to 20 parts by weight, for 100 parts by weight of the conductive fine particles. With a proportion less than 2 parts by weight, the rubber type binder can not sufficiently hold the conductive fine particles. With a proportion exceeding 50 parts by weight, the rubber type binder tends to cover the conductive fine particles as electrode, and therefore sufficient electrostatic capacitance may not be obtained.

The proportion of the non-conductive fine particles may be like that given above. Usually, the proportion may be about 0 to 30% by weight, preferably 2 to 10 parts by weight, of the rubber quantity. With a proportion exceeding 30% by weight, the resistance is too high to be practical.

The rubber solution may incorporate, if desired, such additives as adhesion reinforcing materials, rubber deterioration prevention materials, rubber cross-linking materials and rubber cross-linking promotion materials. These additives may be those well known in the art. For example, as the adhesion reinforcing material may be used stearic acid, polyacrylic acid, vinyl acetate, polyvinyl alcohol, etc., as the rubber deterioration prevention material may be used BHT, MBMBP, etc., as the rubber cross-linking material may be used resin cross-linking materials, S cross-linking materials, oxime cross-linking materials, metal cross-linking materials, etc., and as the rubber cross-linking promotion materials, may be used DPG, TBTD, TMTD, TMTM, DPTT, ZnPDC, ZnMDC, ZnBDC, MBT, MBTS, CBS, BBS, CTP, BAA, zinc white, etc.

Particularly, according to the invention it is possible to contract rubber molecules and obtain porous structure promotion of rubber. At the same time, it is possible to further enhance the stability against propylene carbonate type solvent by adding cross-linking material. The quantity of cross-linking material to be added varies in dependence on the type of cross-linking material. Usually, the quantity may be about 1 to 10% by weight of the rubber quantity. Adding the material in excess of 10% by weight, does not provide for corresponding property improvement, and it is thus economically undesirable. In some cases, however, the quantity may exceed 10% by weight.

The rubber type binder, conductive fine particles, non-conductive fine particles, etc., may be mixed together by any method so long as the components are uniformly mixed together. For example, the components may be uniformly mixed together with a kneeder, a mixer, a homogenizer or like well-known mixing mechanism to a slurry. The mixture film may be formed by using an appropriate method, for instance coating (using a brush, a spray, a roller, etc.), a doctor blade method, a dipping method, etc. The thickness of the film to be formed may be appropriately set in dependence upon the purpose of the final product, the type of the conductive base, etc. Usually, the thickness may be about 25 to 1,000 $\mu$m, preferably 100 to 500 $\mu$m. By forming the film on each of the two surfaces of conductive metal sheet, the electrostatic capacitance per unit volume may be further improved.

According to the invention, if desired and also to such an extent that the contact between the conductive fine particles and the electrolyte, the mixture film formed on the conductive base may be subjected to a pressure application process with a press roller, oil hydraulic press, etc. to improve the conductive film particles deposition property or the like, thus improving the electrostatic capacitance per unit volume and realize reduced resistance.

When causing cross-linking of the mixture by adding a cross-linking material thereto, the resultant system may be thermally dried or dried and then heat treated, or heat treatment may be done simultaneously with the pressure application process. The heat treatment temperature at the time of the cross-linking may usually be set to about 100 to 220° C., and the heating time may be appropriately set in accordance with the heating temperature or like parameters.

According to the invention, it is further possible to preliminarily incorporate a foaming agent in the mixture containing the rubber solution and the conductive fine particles and cause self-foaming of the mixture by the heating process at the time of drying or cross-linking. As the foaming agent may be used what is incorporated in well-known resin or the like. Examples of the foaming material may be benzenesulfonylhydrazide, paratoluenesulfonylhydrazide, etc. The amount of the foaming agent to be added is usually preferably in a range not exceeding 3% by weight (more preferably 0.1 to 3% by weight). Adding the foaming agent in excess of 3% by weight is undesired because in this case it becomes difficult to control the thickness and the like.

EXAMPLE 1

A rubber solution (solid part concentration: about 10% by weight) was prepared by dissolving butyl rubber as binder, a sulfur type cross-linking material (3% with respect to rubber) and an organic cross-linking promotion material (i.e., 2% of TMTM relative to rubber) in toluene. Then, active carbon (200 m2/g of BWT, average particle diameter: 10 $\mu$m, manufactured by Kurare Chemical, Co., Ltd.), graphite (average particle diameter: 0.8 $\mu$m, Japan Graphite Industries Co., Ltd.) and alumina (average particle diameter: 1 $\mu$m, Wako Junyaku Co., Ltd.) as non-conductive fine particles, were mixed together in proportions (solid part proportions) as listed in Table 1 to prepare slurries, respectively. Each of these slurries was coated on an aluminum foil (thickness: 30 $\mu$m, manufactured by JCC Co., Ltd.), which was a conductive base (or collector electrode) etching treated with hydrochloric acid, with a self-weight type roll coater (manufactured by Hosen Co., Ltd.) to obtain an electrode foil (thickness: 150 $\mu$m), and the system was then subjected to pressure application with a roll press (Hosen Co., Ltd.) with linear pressure of one ton to obtain an electrode foil (thickness: 150 $\mu$m).

TABLE 1

|  | Active Carbon | Graphite | Butyl rubber | Alumina | Zinc oxide | Not etched | etched | Colloidal carbon processed |
|---|---|---|---|---|---|---|---|---|
| Example 1 | 80 | 9 | 10 | 1 |  |  | ○ |  |
| Example 2 | 80 | 9 | 10 |  | 1 |  | ○ |  |
| Example 3 | 80 | 9 | 10 |  | 1 | ○ | ○ |  |
| Contrast Example 1 | 80 | 10 | 10 |  |  |  | ○ |  |
| Contrast Example 2 | 80 | 10 | 10 |  |  | ○ |  |  |

EXAMPLE 2

Like Example 1, butyl rubber, active carbon, graphite, zinc oxide (average grain diameter: 0.5 $\mu$m, manufactured by Wako Junyaku were mixed together in proportions as listed in Table to obtain a slurry. The slurry was coated on an etched aluminum foil, and the system was subjected to pressure application to obtain an electrode foil.

EXAMPLE 3

The slurry in Example 2 was then coated an etching aluminum foil with colloidal carbon dispersion (manufactured by Nippon Graphite Industries) coated thereon, and the system was then subjected to pressure application with a press to obtain an electrode foil.

Contrast Example 1

Like Example 1, a slurry was prepared by mixing together butyl rubber, active carbon and graphite in proportions as listed in Table 1. The slurry was coated on an etching aluminum foil, and the system was then subjected to pressure application to obtain an electrode foil.

Contrast Example 2

The slurry in Example 2 was applied to heat-treated aluminum foil (thickness: 30 $\mu$m, JCC Co., Ltd.), and the system was subjected to pressure application to obtain an electrode foil.

The electrode foils obtained in the above Examples and Contrast Examples and a cellulose type separator (thickness: 50 $\mu$m) were each taken up on a take-up machine (manufactured by Keihin Rika Kogyo Co., Ltd.) and then dried at 150° C. in 24 hours. Each eventual sample thus obtained was then inserted and sealed together with propylene carbonate 1 M solution in 18650 can (diameter: 18 mm, length: 65 mm) to obtain an electric double layer capacitor.

Each electric double layer capacitor thus obtained was charged up to 2.5 V, and then by constant current discharge of 1 A shown to 0.1 V. The electrostatic capacitance was computed in the following way. In addition, the direct current discharge was computed from IR drop after direct current discharge. The results are listed in Table 2.

$$C(F)=1(A)\cdot T(\sec)/V$$

TABLE 2

|  | Electrostatic capacitance (F) | Electrostatic capacitance (F/cc) | Direct current discharge resistance (m Ω) |
| --- | --- | --- | --- |
| Example 1 | 259.7 | 15.7 | 28.7 |
| Example 2 | 268.0 | 16.2 | 26.5 |
| Example 3 | 302.7 | 18.3 | 27.3 |
| Contrast Example 1 | 256.4 | 15.5 | 137.3 |
| Contrast Example 2 | 127.4 | 7.7 | 50.2 |

In the porous electrode according to the invention, the rubber type binder has a porous structure, which does not cover the conductive fine particles as electrode so that the electrolyte solution can be in sufficient contact with the conductive fine particles. It is thus possible to attain excellent electrostatic capacitance. Also, by improving the compressibility with press, it is possible to improve the electrostatic capacitance per unit volume and realize low resistance.

In the prior art, a mixture obtained by mixing together active carbon and carbon black with rubber and evaporating the solvent, is formed to a sheet-like shape. In this case, as shown in FIG. 2, the rubber type binder 1 covers the conductive fine particles, and therefore it is impossible to attain sufficient electrostatic capacitance.

In contrast, according to the invention conductive and non-conductive fine particles are mixed with a solution with rubber dissolved therein, the mixture thus obtained is formed into a film, and film is then contacted, if necessary, with a solvent permitting precipitation of rubber, and then the film is dried. In this way, the porous structure promotion can be effectively obtained as shown in FIGS. 1 and 2. Furthermore, if necessary, by cross-linking the dried film with a heat treatment and thus contracting molecule particles, it is possible to further expand the zone permeated by the electrolyte solution (i.e., the area of contact with conductive fine particles).

As shown above, the binder part of the electrode material was made to have a porous structure having continuous pores in a three-dimensional network fusion. It is thus possible to realize satisfactory state of contact between electrolyte and conductive fine particles, and thus excellent electrostatic capacitance and low resistance can be attained at a time. In addition, such rubber type binder having such porous structure is excellent in the adhesion and other properties, and it is thus possible to attain improvement of the electrostatic capacitance, which has heretofore been thought to be difficult, and also improvement of the conductive fine particles deposition property, solvent resistance, vibration resistance and the like.

The binder for porous electrode according to the invention may be made porous by using the conductive adhesive solution obtained by dispersing conductive and non-conductive fine particles in rubber solution as electrode material, drying the adhesive solution and heat treating and cross-linking the dried electrode material. It is thus possible to attain satisfactory state of contact between the electrolyte solution and the conductive fine particles, thus permitting excellent electrostatic capacitance and low resistance to be attained at a time.

Besides, the porous binder for the porous electrode is excellent in adhesion, so that it is excellent in the deposition property, vibration resistance and the like concerning the conductive fine particles constituting the electrode. Furthermore, by cross-linking the rubber it is possible to promote the porous structure and enhance the solvent resistance and obtain excellent stability with respect to a wide variety of different types of solvents (particularly solvents used for electrolyte solution). Further, by dispersing not only conductive fine particles but also non-conductive fine particles in the porous rubber type binder, it is possible to apply pressure to the porous electrode with a press while maintaining the porosity of the electrode and realize electrostatic capacitance and low resistance per unit volume.

Furthermore, by selecting rubber having solvent resistance in combination with the electrolyte, it is possible to obtain more excellent effect. Also, by adding, to an electrolyte solution containing propylene carbonite as solvent, butyl rubber, ethylenepropylenediene rubber, etc. having excellent resistance with respect to the solvent, and it is thus possible to ensure more excellent state of contact and obtain an electrode excellent in stability and reliability.

According to the invention, unlike the case of adopting PTFE as binder, it is possible to readily use the adhesion increasing material, rubber stabilizer, electrolyte solution stabilizer, surface active agent and various additive, etc, and it is thus possible to enhance the dispersion property of the binder, extend the pot life after preparation of the mixture and provide various other properties.

The porous electrode as described above according to the invention can be extensively utilized for such purposes as electric double layer capacitors, aluminum electrolytic capacitors, tantalum, electrolytic capacitors, titanium electrolytic capacitors, lithium on secondary battery electrodes, etc.

What is claimed is:

1. A binder for a porous electrode, comprising a conductive adhesion solution obtained by dispersing conductive and non-conductive fine particles in a rubber solution, wherein the non-conductive fine particles are at least one member of the group consisting of silica, zinc oxide, magnesium oxide, magnesium carbonate, wollastonite, diatomaceous earth, mica, calcium carbonate, aluminum hydroxide, alumina, magnesium hydroxide, clay, chalk, wood particles, or pulp.

2. The binder for a porous electrode according to claim 1, wherein the rubber solution comprises at least one member of the group consisting of butyl rubber, ethylenepropylenediene rubber, isopropyrene rubber, nitrile rubber or butadiene.

3. The binder for a porous electrode according to claim 1, wherein the conductive fine particles are at least one member of the group consisting of a carbon, a conductive polymer or a metal.

4. The binder for a porous electrode according to claim 1, wherein the conductive fine particles are at least one member of the group consisting of active carbon, carbon black, graphite, meso-phase carbon, polyacetylene, polyparaphenylene, polyphenylenevinylene, polypyrrole, polyaniline, aluminum, tantalum, titanium, nickel, vanadium oxide, ruthenium oxide, titanium nitride, lithium manganate or lithium cobaltate.

5. The binder for a porous electrode according to claim 1, which further includes a crosslinking agent.

6. A porous electrode, comprising a film having porous structure formed on a conductive base, the film being formed by coating the binder for a porous electrode according to claim 1, on the conductive base, and drying the binder.

7. The porous electrode according to claim 6, wherein the film is further formed by heat treating or pressing, or both, the binder coating.

8. The porous electrode according to claim 6, wherein the conductive base is a sheet comprised of at least one member of the group consisting of aluminum, nickel, copper, stainless steel, titanium or conductive rubber.

9. The porous electrode according to claim 6, wherein a surface of the conductive base is roughened by an acid treatment, an alkali treatment or blast treatment before coating with the binder.

10. The porous electrode according to claim 6, wherein a surface of the conductive base is coated with at least one member of the group consisting of silane coupling, titanium coupling or colloidal carbon before coating with the binder.

* * * * *